United States Patent
Bian et al.

(10) Patent No.: US 11,088,503 B2
(45) Date of Patent: Aug. 10, 2021

(54) LASER WITH A GAIN MEDIUM LAYER DOPED WITH A RARE EARTH METAL WITH UPPER AND LOWER LIGHT-CONFINING FEATURES

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 77 days.

(21) Appl. No.: 16/525,878

(22) Filed: Jul. 30, 2019

(65) Prior Publication Data

US 2021/0036479 A1  Feb. 4, 2021

(51) Int. Cl.
  *H01S 3/16*  (2006.01)
  *H01S 3/063*  (2006.01)
(52) U.S. Cl.
  CPC ............ *H01S 3/063* (2013.01); *H01S 3/0637* (2013.01); *H01S 3/161* (2013.01); *H01S 3/1603* (2013.01); *H01S 3/1608* (2013.01); *H01S 3/1611* (2013.01); *H01S 3/1616* (2013.01); *H01S 3/1618* (2013.01)
(58) Field of Classification Search
  CPC ...... H01S 3/063; H01S 3/0637; H01S 3/1603; H01S 5/1603; H01S 5/166; H01S 5/168; H01S 5/22
  See application file for complete search history.

(56) References Cited

U.S. PATENT DOCUMENTS

| 4,697,868 | A | | 10/1987 | Thanivavarn |
| 6,031,858 | A | * | 2/2000 | Hatakoshi ........... H01S 5/32341 372/46.01 |

(Continued)

FOREIGN PATENT DOCUMENTS

WO  2008/117249 A1  10/2008

OTHER PUBLICATIONS

Belt, "Arrayed narrow linewidth erbium-doped waveguide-distributed feedback lasers on an ultra-low-loss silicon-nitride platform," Nov. 2013, Optics Letters, vol. 38, No. 22, 4825-4828. (Year: 2013).*

(Continued)

*Primary Examiner* — Michael Carter
(74) *Attorney, Agent, or Firm* — Hoffman Warnick LLC

(57) ABSTRACT

One illustrative laser disclosed herein includes a gain medium layer having a first width in a transverse direction that is orthogonal to a laser emitting direction of the laser, and an upper light-confining structure positioned above an upper surface of the gain medium layer, wherein the upper light-confining structure has a second width in the transverse direction that is equal to or less than the first width and comprises at least one material having an index of refraction that is at least 2.0. The laser also includes a lower light-confining structure positioned below a lower surface of the gain medium layer, wherein the lower light-confining structure has a third width in the transverse direction that is equal to or less than the first width and comprises at least one material having an index of refraction that is at least 2.0.

20 Claims, 15 Drawing Sheets

(56) References Cited

U.S. PATENT DOCUMENTS

| | | | |
|---|---|---|---|
| 6,330,388 | B1 | 12/2001 | Bendett et al. |
| 6,891,983 | B2 | 5/2005 | Hammer |
| 7,787,509 | B2 * | 8/2010 | Ukai .................. B82Y 20/00 |
| | | | 372/45.011 |
| 9,470,844 | B1 | 10/2016 | Ma et al. |
| 10,191,215 | B2 | 1/2019 | Kippenberg et al. |
| 10,215,920 | B2 | 2/2019 | Ma et al. |
| 10,241,267 | B2 | 3/2019 | Kiyota et al. |
| 2008/0285610 | A1 | 11/2008 | Hall et al. |

OTHER PUBLICATIONS

Sun, "Horizontal single and multiple slot waveguides:optical transmission at λ=1550 nm," Dec. 2007, Optics Express, vol. 15, No. 26, 17967-17972. (Year: 2007).*

Belt and Blumenthal, "Erbium-doped waveguide DBR and DFB laser arrays integrated within an ultra-low-loss Si3N4 platform," Optics Express, 22:10655-60, May 5, 2014.

Bian et al., "Hybrid vanadata waveguiding configurations for extreme optical confinement and efficient polarization management in the near-infrared," Nanoscale, 10:16667-74, 2018.

Dai et al., "Compact broadband polarizer based on shallowly-etched silicon-on-insulator ridge optical waveguides," Optics Express, 18:27404-15, Dec. 20, 2010.

De Oliveira and de Matos, "Graphene Based Waveguide Polarizers: In-Depth Physical Analysis and Relevant Parameters," Scientific Reports, 5:16949, Nov. 19, 2015.

Edwards et al., "Experimental Verification of Epsilon-Near-Zero Metamaterial Coupling and Energy Squeezing Using a Microwave Waveguide," Physical Review Letters, 100:033903, 2008.

Huang et al., "CMOS compatible horizontal nanoplasmonic slot waveguides TE-pass polarizer on silicon-on-insulator platform," Optics Express, 21:12790-96, May 20, 2013.

Liberal and Engheta, "Near-zero refractive index photonics," Nature Photonics, 11:149-58, Mar. 2017.

Maas et al., "Experimental realization of an epsilon-near-zero metamaterial at visible wavelengths," Nature Photonics, published online Oct. 13, 2013.

Maes et al., "3.4 W Monolithic Erbium-Doped All-Fiber Laser at 3.55 um," 2017 Crown.

Peled et al., "Monolithic rare-earth doped sol-gel tapered rib waveguide laser," Applied Physics Letters, 92:221104, 2008.

Polman, "Energy transfer in erbium doped optical waveguides based on silicon," ISBN 90-393-2491-3.

Purnawirman et al., "C- and L-band erbium-doped waveguide lasers with wafer-scale silicon nitride cavities," Opticals Letters, 38:1760-62, Jun. 1, 2012.

Purnawirman et al., "Ultra-narrow-linewidth Al2O3:Er3+ lasers with a wavelength-insensitive waveguide design on a wafer-scale silicon nitride platform," Optics Express, 25:13705-13, Jun. 12, 2017.

Saini et al., "Analysis of Silicon Clad Optical Waveguide for High Extinction Ratio TE/TM Pass Polarizers using Resonant Coupling between Guided Modes and Lossy Modes," IOSR Journal of Electrical and Electronics Engineering, 12:59-64, May-Jun. 2017.

Selvaraja and Sethi, Emerging Waveguide Technology, Chapter 6, Review on Optical Waveguides, pp. 95-129, 2018.

Sun et al., "Experimental demonstration of a hybrid plasmonic transverse electric pass polarizer for a silicon-on-insulator platform," Optics Letters, 37:4814-16, Dec. 1, 2012.

Syms and Cozens, Optical Guided Waves and Devices, Chapter Nine, Channel Waveguide Integrated Optics.

U.S. Appl. No. 16/291,346, filed Mar. 4, 2019, entitled "Polarizers and Polarization Splitters Phase-Matched with a Back-End-of-Line Layer".

* cited by examiner

LASER WITH A GAIN MEDIUM LAYER DOPED WITH A RARE EARTH METAL WITH UPPER AND LOWER LIGHT-CONFINING FEATURES

BACKGROUND

Field of the Disclosure

Generally, the present disclosure relates to various novel embodiments of a laser with a gain medium layer doped with a rare earth metal with upper and lower light-confining features.

Description of the Related Art

Optical communication is any form of telecommunication that uses light as the transmission medium. In general, an optical communication system consists of a transmitter, which encodes a message into an optical signal, a channel, which carries the signal to its destination, and a receiver, which reproduces the message from the received optical signal. A laser is a device that emits light through a process of optical amplification based on the stimulated emission of electromagnetic radiation. In general, a laser consists of a gain medium, a mechanism to energize the gain medium and something to provide optical feedback. The gain medium comprises a material with properties that allow it to amplify light, i.e., increase its power, by way of stimulated emission. Light of a specific wavelength that passes through the gain medium is amplified. For the gain medium to amplify light, it needs to be supplied with energy in a process called pumping. The energy is typically suppled as an electric current or as light at a different wavelength. In silicon photonics platforms, integrated lasers are a field of great interest as silicon is a poor light emitter. Among various solutions, lasers based upon rare-earth-doped glass on silicon feature narrow linewidths while offering direct compatibility with monolithic CMOS fabrication processes.

With respect to optical communication systems, lasers are an important part of photonic integrated circuits. A photonic integrated circuit (PIC) or integrated optical circuit is a circuit that integrates multiple (at least two) photonic functions and, at least at that level, is similar to an electronic integrated circuit. One major difference between a photonic integrated circuit (PIC) and an electronic integrated circuit is that a photonic integrated circuit provides functions for generation and transmission of information signals imposed on optical wavelengths typically in the visible spectrum or near infrared wavelengths, e.g., 850-1650 nm. In a monolithic CMOS compatible silicon photonics platform, photonic integrated circuits are typically formed above a semiconductor substrate along with other active photonic devices such as modulators, photodetectors and passive photonic components such as waveguides, bends, tapers, splitters, couplers, etc., and monolithically integrated with integrated circuits that include active semiconductor devices, e.g., transistors, as well as passive semiconductor devices, such as resistors, capacitors, etc. Applications where high-quality ultra-narrow-linewidth lasers are used in such photonic integrated circuits include, for example, coherent LIDAR (light detecting and ranging), optical communications, optical metrology and sensing, etc. The structure and materials used for a laser in photonic integrated circuits must be consistent with the materials and fabrication methods used to form the remaining parts or components of the integrated circuit product, e.g., the CMOS-based transistors that are part of the IC product. Moreover, as with most integrated circuit products, there is a constant drive to reduce the size or footprint of all elements of any circuit including that of photonic integrated circuits that include a laser.

The present disclosure is directed to various novel embodiments of a laser with a gain medium layer doped with a rare earth metal and with upper and lower light-confining features.

SUMMARY

The following presents a simplified summary of at least one disclosed embodiment in order to provide a basic understanding of some aspects of the subject matter disclosed herein. This summary is not an exhaustive overview of all of the subject matter disclosed herein. It is not intended to identify key or critical elements of the subject matter disclosed herein or to delineate the scope of any claims directed to any of the subject matter disclosed herein. Its sole purpose is to present some concepts in a simplified form as a prelude to the more detailed description that is discussed later in the application.

The present disclosure is generally directed to various novel embodiments of a laser with a gain medium doped with a rare earth metal and with upper and lower light-confining features. One illustrative laser disclosed herein includes a laser emitting direction and a transverse direction that is orthogonal to the laser emitting direction wherein the laser also includes a gain medium layer having an upper surface, a lower surface and a first width in the transverse direction, and an upper light-confining structure positioned above the upper surface of the gain medium layer, wherein the upper light-confining structure has a second width in the transverse direction that is equal to or less than the first width and comprises at least one material having an index of refraction that is at least 2.0. In this example, the laser also includes a lower light-confining structure positioned below the lower surface of the gain medium layer, wherein the lower light-confining structure has a third width in the transverse direction that is equal to or less than the first width and comprises at least one material having an index of refraction that is at least 2.0.

BRIEF DESCRIPTION OF THE DRAWINGS

The disclosure may be understood by reference to the following description taken in conjunction with the accompanying drawings, in which like reference numerals identify like elements, and in which.

Figure 1:
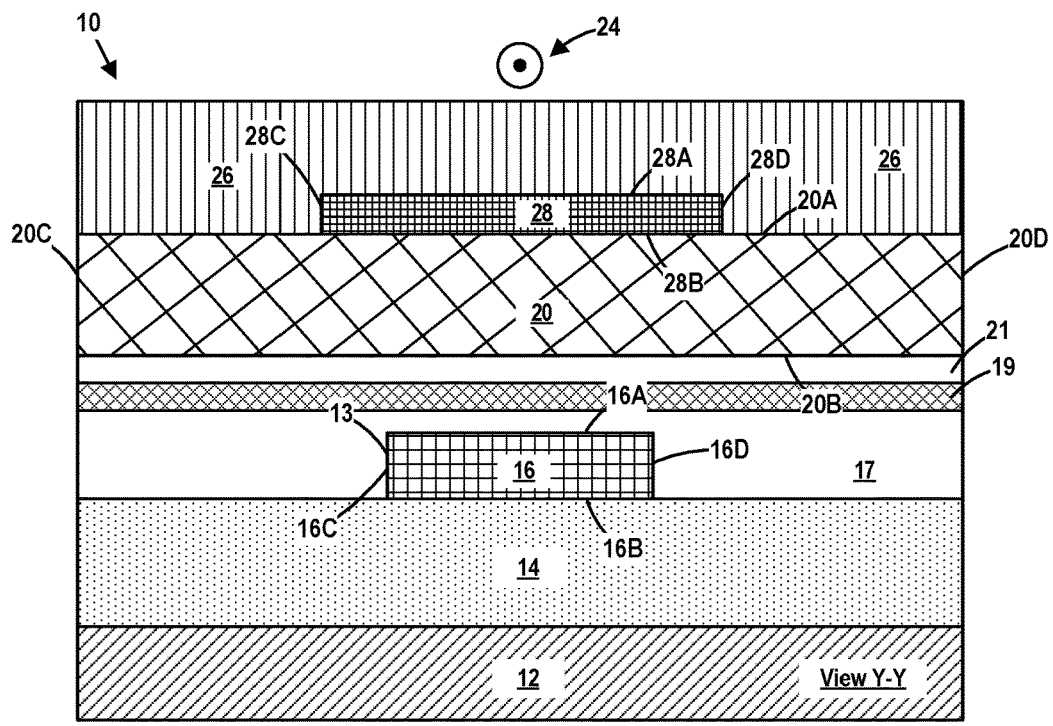
FIGS. 1-17 depict various novel embodiments of a laser with a gain medium layer doped with a rare earth metal and with upper and lower light-confining features.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present disclosure will now be described with reference to the attached figures. Various structures, systems and devices are schematically depicted in the drawings for purposes of explanation only and so as to not obscure the present disclosure with details which are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary or customary meaning as understood by those skilled in the art, is intended to be implied by consistent usage of the term or phrase herein. To the extent that a term or phrase is intended to have a special meaning, i.e., a meaning other than that understood by skilled artisans, such a special definition shall be expressively set forth in the specification in a definitional manner that directly and unequivocally provides the special definition for the term or phrase.

Of course, the inventions disclosed herein should not be considered to be limited to the illustrative examples depicted and described herein. The various components and structures of the various embodiments of the lasers disclosed herein may be formed using a variety of different materials and by performing a variety of known processing techniques, e.g., chemical vapor deposition (CVD), low-pressure chemical vapor deposition (LPCVD), plasma enhanced chemical vapor deposition (PECVD), atomic layer deposition (ALD), a thermal growth, as well as known patterning and etching techniques, etc. The thicknesses of the various layers of material depicted herein may also vary depending upon the particular application. With reference to the attached figures, various illustrative embodiments of the devices disclosed herein will now be described in more detail.

The various embodiments of the lasers 10 disclosed herein will be fabricated on a semiconductor-on-insulator (SOI) substrate. In general, the SOI structure comprises a base semiconductor substrate 12, a buried insulation layer 14 (sometimes referred to as a "BOX" layer when the insulation layer comprises silicon dioxide) and a semiconductor layer 13 that is positioned on the buried insulation layer 14. Traditionally, and in one illustrative embodiment, the base semiconductor substrate 12 may comprise silicon, the buried insulation layer 14 may comprise silicon dioxide and the semiconductor layer 13 may comprise silicon. Of course, the base semiconductor substrate 12 and the semiconductor layer 13 may be made of any of a variety of different semiconductor materials, and the materials for the base semiconductor substrate 12 and the semiconductor layer 13 need not be made of the same material in all applications, but such a situation may occur in some applications. Similarly, the buried insulation layer 14 may be comprised of a variety of different insulating materials. The thickness of the layers of the SOI substrate may vary depending upon the particular application. The manner in which such SOI substrates are manufactured are well known to those skilled in the art.

Figure 2:
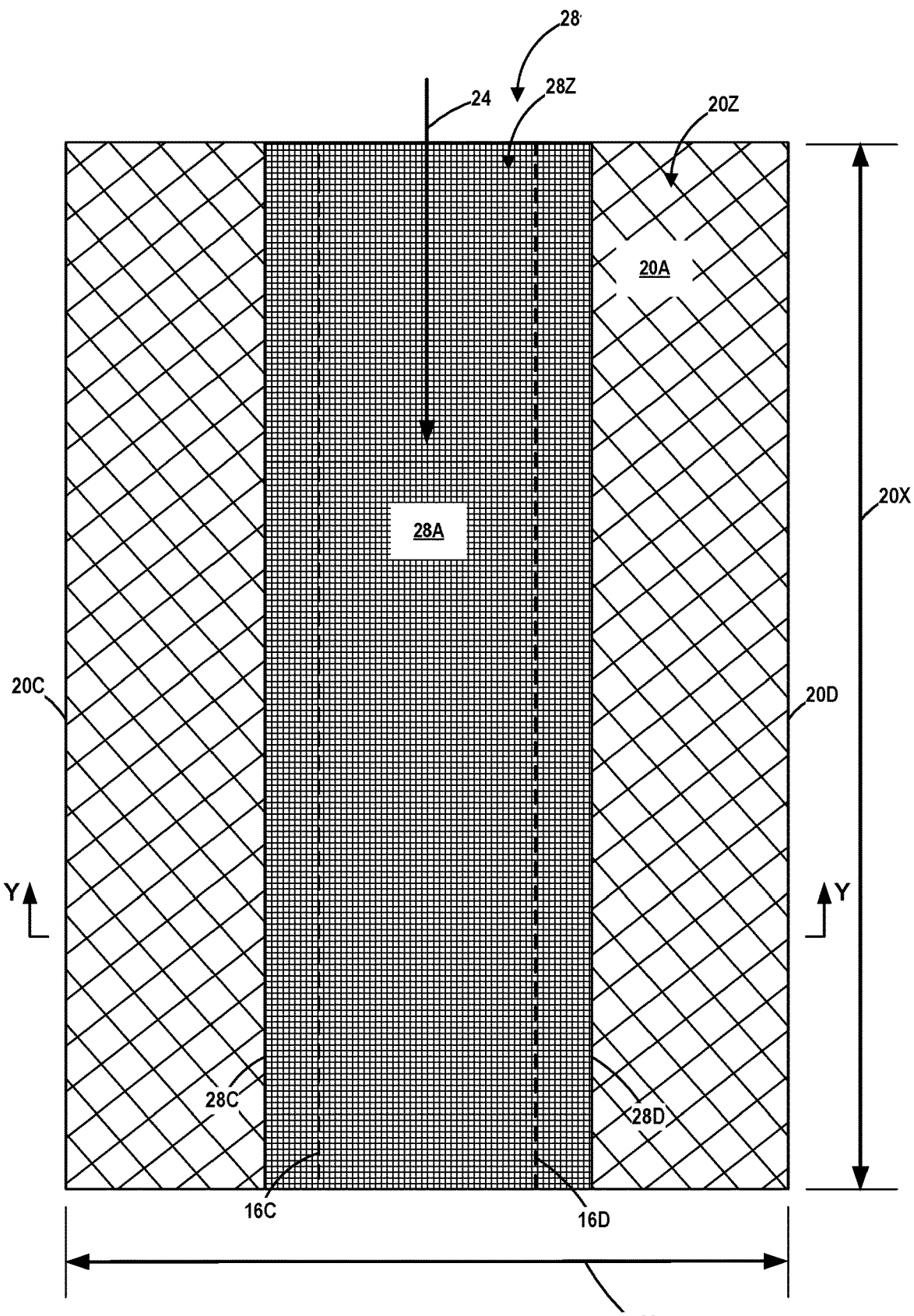

FIGS. 1-2 depict one illustrative embodiment of a laser 10 disclosed herein. FIG. 1 is a cross-sectional view taken through the laser 10 in a direction that is transverse (or orthogonal) to a laser emitting direction 24 of the laser 10. FIG. 2 is a plan view that depicts certain components of the laser 10. With reference to FIG. 1, in general, this embodiment of the laser 10 comprises a lower light-confining structure 16, a gain medium layer 20, positioned above the lower light-confining structure 16, an upper light-confining structure 28 positioned above the gain medium layer 20, and first and second layers of a low-refractive-index insulating material 17 and 21, respectively. Also depicted in FIG. 1 is a first layer of high index of refraction material 19. The first layer of high index of refraction material 19 may be comprised of any of a variety of materials having an index of refraction that is greater than 2.0, e.g., silicon nitride, silicon, SiON, etc. In general, the first layer of high index of refraction material 19 may have an index of refraction that is greater than either of the first and second layers of a low-refractive-index of refraction insulating material 17 and 21.

In one illustrative embodiment, the lower light-confining structure 16 may be fabricated from the semiconductor layer 13. The lower light-confining structure 16 has an upper surface 16A, a bottom surface 16B and side surfaces 16C, 16D. The upper light-confining structure 28 has an upper surface 28A, a bottom surface 28B and side surfaces 28C, 28D. The gain medium layer 20 has an upper surface 20A, a bottom surface 20B and side surfaces 20C, 20D. The first and second layers of low-refractive-index of refraction insulating material 17 and 21 may be comprised of any insulating material having a refractive index of less than about 1.4, e.g., silicon dioxide, SiCOH, a polymer, etc. Additional insulating material 26 is formed above the gain medium layer 20. The insulating material 26 is intended to be representative of any type of insulating material, e.g., silicon dioxide, or any other material commonly used in back-end-of-line (BEOL) manufacturing processes when manufacturing IC products. Although the insulating material 26 is simplistically depicted as being a single layer of material, in practice, the insulating material 26 may comprise several layers of different materials. As will be appreciated by those skilled in the art, the insulating material 26, the layers of low-refractive-index of refraction insulating material 17 and 21, and the buried insulation layer 14 function as cladding layers for the light that will pass through the gain medium layer 20. That is, these materials will be used to confine the light such that substantially all of the light travels within the gain medium layer 20. The presence of the lower light-confining structure 16 and the upper light-confining structure 28 helps to confine the laser mode along both the horizontal direction (left-to-right in FIG. 1) and the vertical direction (top-to-bottom in FIG. 1). Moreover, since the lower light-confining structure 16 and the upper light-confining structure 28 are made of one or more materials having a relatively higher index of refraction (e.g., at least 2.0 or greater) as compared to that of the gain medium layer 20, the presence of the lower light-confining structure 16 and the upper light-confining structure 28 also tends to reduce the size of the laser mode.

As noted above, FIG. 2 is a plan view of portions of the laser 10 shown in FIG. 1. FIG. 2 shows the upper surface 28A and side surfaces 28C, 28D of the upper light-confining structure 28, as well as portions of the upper surface 20A and the side surfaces 20C, 20D of the gain medium layer 20. For reference purposes, the positions of the side surfaces 16C, 16D of the lower light-confining structure 16 positioned vertically below the gain medium layer 20 are also depicted in dashed lines in FIG. 2. With reference to FIG. 2, the gain medium layer 20 portion of the laser 10 may, in one embodiment, have a generally rectangular configuration when viewed from above. Other configurations for the gain medium layer 20 are also possible. For example, in another embodiment (not shown), the gain medium layer 20 portion of the laser 10 may have a generally trapezoidal configuration when viewed from above with light entering the gain medium layer 20 at the widest end surface of the trapezoid and exiting the gain medium layer 20 via the narrowest end surface of the gain medium layer 20.

In the depicted example, the substantially rectangular shaped gain medium layer 20 depicted herein has a dimension (or length) 20X in a direction corresponding to the direction of the laser emitting direction 24 of the laser 10 and a dimension (or width) 20Y in a direction that is transverse to the laser emitting direction 24 of the laser 10. In general, when it is stated herein that a layer or a structure disclosed herein has a length and/or width dimension, it shall be understood that those dimensions are in the same direction as the length 20X and the width 20Y of the gain medium layer 20 shown in FIG. 2. The dimensions 20X and 20Y may vary depending upon the particular application. In one illustrative example, the length 20X may range from several to tens of millimeters, while the width 20Y may range from several micrometers (µm) to several millimeters. In one embodiment, the upper surface 20A of the gain medium layer 20 defines a surface area 20Z (width 20Y×length 20X), wherein the bottom surface 20B also has the same surface area. The vertical thickness of the gain medium layer 20 may also vary depending upon the particular application, e.g., it may have a thickness that falls within the range of hundreds of nanometers to several micrometers. In some applications, the axial length of the lower light-confining structure 16 and/or the upper light-confining structure 28 (in a direction corresponding to the direction of the laser emitting direction 24) may be less than, substantially equal to or greater than the length 20X of the gain medium layer 20. In some applications, the physical dimensions (e.g., thickness, length and/or width) of the lower light-confining structure 16 and the upper light-confining structure 28 may be substantially the same, but, in other applications, one or more of the physical dimensions of the lower light-confining structure 16 and the upper light-confining structure 28 may be different from one another.

As shown in FIG. 2, various cross-sectional views of the various embodiments of the laser 10 disclosed herein are taken through the laser 10 where indicated by the section Y-Y. Of course, FIGS. 1 and 2 do not depict all embodiments and the different configurations of the lower light-confining structure 16 and the upper light-confining structure 2 disclosed herein, but FIG. 2 is provided to show the location where the cross-sectional views of the additional embodiments of the lasers 10 disclosed herein are taken.

The thicknesses of the materials of the laser 10 as well as their other physical dimensions may vary depending upon the particular application. In one illustrative embodiment, the gain medium layer 20 may comprise aluminum oxide ($Al_2O_3$) (or other oxide materials such as zinc oxide (ZnO), titanium dioxide ($TiO_2$), bismuth-oxide ($Bi_2O_3$)) that is doped with a rare earth metal, e.g., $erbium^{3+}$ (Er), ytterbium (Yb), neodymium (Nd), thulium (Tm), holmium (Ho), etc. As will be appreciated by those skilled in the art, the particular rare earth metal selected may vary depending upon the particular application. For example, erbium or ytterbium may be used when the wavelength of the light generated by the laser 10 is about 800-980 nm; ytterbium or neodymium may be used when the wavelength of the laser 10 is about 1050 nm; neodymium may be used when the wavelength of the laser 10 is about 1300 nm; erbium may be used when the wavelength of the laser 10 is about 1550 nm; and thulium or holmium may be used when the wavelength of the laser 10 is about 2000 nm.

The lower light-confining structure 16 may be comprised of at least one material having an index of refraction ("n") that is at least 2.0 or greater. The lower light-confining structure 16 may be comprised of a variety of different materials, e.g., silicon, silicon nitride, AlN, SiON, materials having an index of refraction ("n") greater than 2, etc. In general, the lower light-confining structure 16 will be made of a material having a greater index of refraction than the index of refraction of the gain medium layer 20. The physical dimensions, e.g., the thickness, length and width, of the components of the lower light-confining structure 16 may vary depending upon the particular application. In one illustrative embodiment, the lower light-confining structure 16 shown in FIG. 1 may have a thickness of about 20-300 nm, and a lateral width, i.e., the distance between the side surfaces 16C, 16D of the lower light-confining structure 16, of about 50-300 nm.

The upper light-confining structure 28 may be comprised of at least one material having an index of refraction ("n") that is at least 2.0 or greater. The upper light-confining structure 28 may be comprised of a variety of different materials, e.g., silicon, silicon nitride, AlN, SiON, materials having an index of refraction ("n") greater than 2, etc. In general, the upper light-confining structure 28 will be made of a material having a greater index of refraction than the index of refraction of the gain medium layer 20. The physical dimensions, e.g., the thickness, length and width, of the upper light-confining structure 28 may vary depending upon the particular application. In one illustrative embodiment, the upper light-confining structure 28 may have a thickness of about 20-300 nm, and a lateral width, i.e., the distance between the side surfaces 28C, 28D of the upper light-confining structure 28, of about 50-300 nm. In some applications, the physical dimensions, e.g., the thickness, length and/or width, of the lower light-confining structure 16 and the upper light-confining structure 28 may be different from one another but that may not be the case in all applications. In yet other applications, the physical dimensions of the lower light-confining structure 16 and the upper light-confining structure 28 may be substantially the same.

In general, the first and second layers of a low-refractive-index insulating material 17 and 21 may be made of materials that have an index of refraction that is less than the index of refraction of the gain medium layer 20. The physical dimensions, e.g., the thickness, length and/or width, of each of the first and second layers of a low-refractive-index insulating material 17 and 21 are independent of one another and the physical dimensions of these layers of material may vary depending upon the particular application. In one illustrative embodiment, the vertical thickness of the first and second layers of a low-refractive-index insulating material 17 and 21 may be about 1-200 nm. Additionally, various embodiments of the lasers 10 disclosed below employ multiple layers of the first and second layers of a low-refractive-index insulating material 17 and 21. However, all of the first and second layers of a low-refractive-index insulating material 17 and 21 within a particular embodiment of a laser 10 disclosed herein need not be made of the same material and they need not all have the same physical dimensions, although such a situation may occur in some applications.

In general, the first layer of high index of refraction material 19 will be made of a material that has an index of refraction that is greater than the index of refraction of the gain medium layer 20 and that has an index of refraction ("n") that is at least 2.0. The physical dimensions, e.g., the thickness, length and/or width, of the first layer of high index of refraction material 19 is independent of the physical dimensions of other layers of material in the laser 10. Moreover, the physical dimensions of the first layer of high index of refraction material 19 may vary depending upon the particular application. In one illustrative embodiment, the vertical thickness of the first layer of high index of refraction material 19 may be about 1-200 nm. Additionally, various embodiments of the lasers 10 disclosed below employ multiple layers of the first layer of high index of refraction material 19. However, all of the first layers of high index of refraction material 19 within a particular embodiment of a laser 10 disclosed herein need not be made of the same material and they need not all have the same physical dimensions, although such a situation may occur in some applications.

In some embodiments, at least some of the layers of the first and second layers of a low-refractive-index insulating material 17 and 21 as well as the first layer of high index of refraction material 19 may be made of different materials so as to permit selective etching between adjacent materials. In one illustrative embodiment, the first layer of high index of refraction material 19 may be comprised of a variety of different materials, e.g., silicon nitride ($Si_3N_4$ n=~2 @ 1.31 μm, 1.55 μm), silicon dioxide ($SiO_2$ n=1.45 @ 1.31 μm, 1.55 μm), SiON, $HfO_2$(n=2.0754 @ 1.31 μm; n=2.0709 @ 1.55 μm), $ZrO_2$ (n=2.1155 @ 1.31 μm; n=2.1103 @ 1.55 μm), AlN, $TiO_2$ (n=2.4622 @ 1.31 μm; n=2.4538 @1.55 μm), etc.

In one illustrative embodiment, the third layer of low-refractive-index insulating material 21 may be comprised of a variety of different materials and it may have an index of refraction that is less than the first layer of high index of refraction material 19. In one illustrative embodiment, the third layer of low-refractive-index insulating material 21 may be comprised of a variety of different insulating materials, e.g., silicon dioxide ($SiO_2$ n=1.45 @ 1.31 μm, 1.55 μm), $CaF_2$ (n=1.4272 @ 1.31 μm; 1.4260 @ 1.55 μm), OMCTS (SiCOH) (n=1.406 @ 1.31 μm, 1.55 μm), $MgF_2$ (n=1.3718 @ 1.31 μm; 1.3705 @ 1.55 μm), a polymer, etc. (where "n" is the refractive index).

With respect to the particular embodiment of the laser 10 shown in FIG. 1, it should be noted that the first layer of high index of refraction material 19 and the second layer of low-refractive-index insulating material 21 are positioned vertically between the upper surface 16A of the lower light-confining structure 16 and the bottom surface 20B of the gain medium layer 20. In the depicted example, the bottom surface 20B of the gain medium layer 20 is formed on and in contact with the upper surface of the second layer of low-refractive-index insulating material 21. In this particular example, the second layer of low-refractive-index insulating material 21 covers the entire bottom surface 20B of the gain medium layer 20. In one particular example, both the first layer of high index of refraction material 19 and the second layer of low-refractive-index insulating material 21 are the same physical size (i.e., length and width) as the gain medium layer 20, although their thicknesses may be different from one another. In other embodiments, the length and/or width of one or both of the first layer of high index of refraction material 19 and the second layer of low-refractive-index insulating material 21 may be less than or greater than the corresponding length 20X or width 20Y of the gain medium layer 20.

Figure 3:
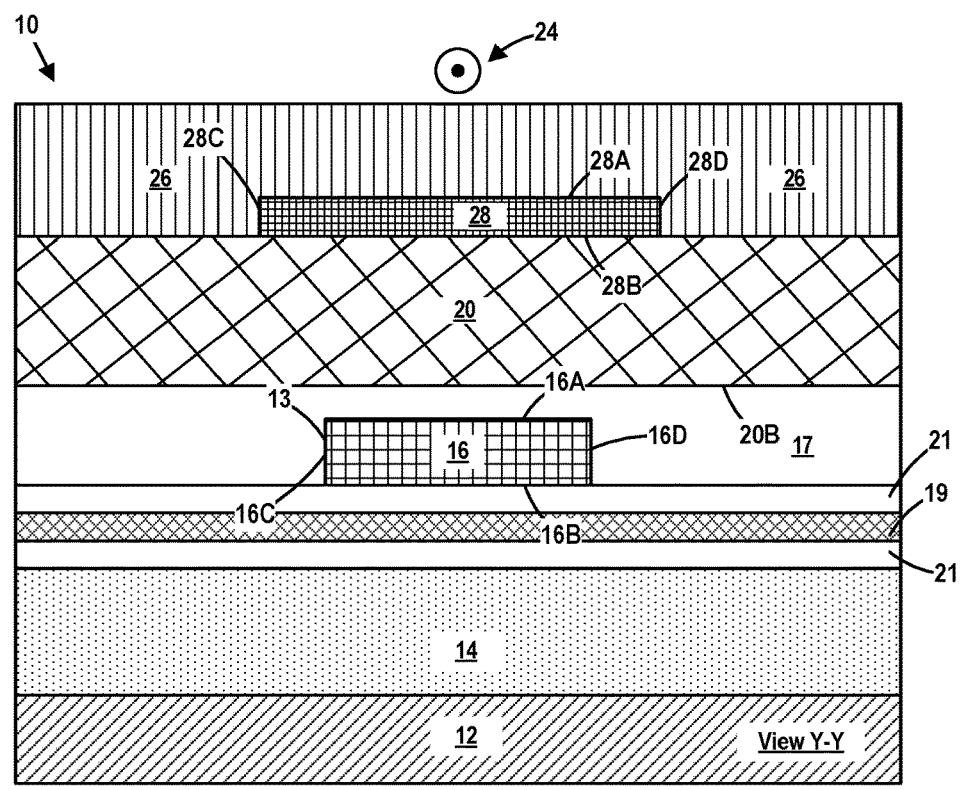

FIG. 3 depicts another embodiment of a laser 10 disclosed herein. In this embodiment, a plurality of layers of the second layer of low-refractive-index insulating material 21 and a single first layer of high index of refraction material 19 are positioned between the bottom surface 16B of the lower light-confining structure 16 and the upper surface of the buried insulation layer 14. In this particular example, the bottom surface 20B of the gain medium layer 20 is formed on and in contact with the upper surface of the first layer of low-refractive-index insulating material 17. As with the previous embodiment, in one particular example, the first layer of high index of refraction material 19 and the two second layers of low-refractive-index insulating material 21 are the same physical size (i.e., length and width) as the gain medium layer 20. In other embodiments, the length and/or width of the first layer of high index of refraction material 19 as well as the length and/or width of one or both of the second layers of low-refractive-index insulating material 21 may be less than or greater than the corresponding length 20X or width 20Y of the gain medium layer 20.

Figure 4:
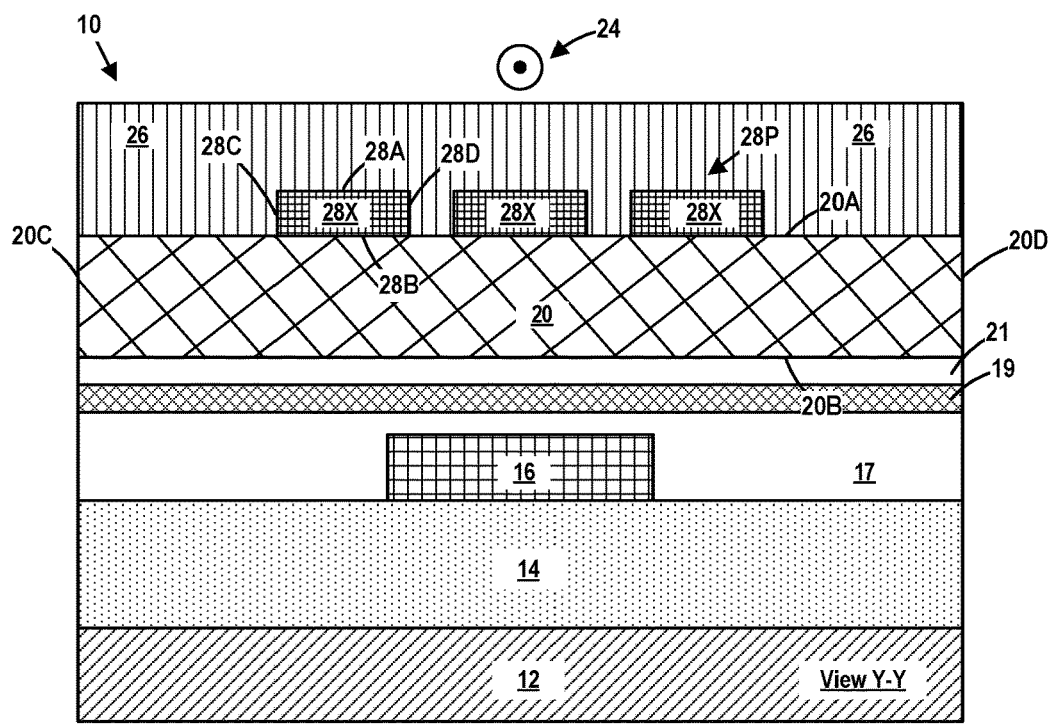
Figure 5:
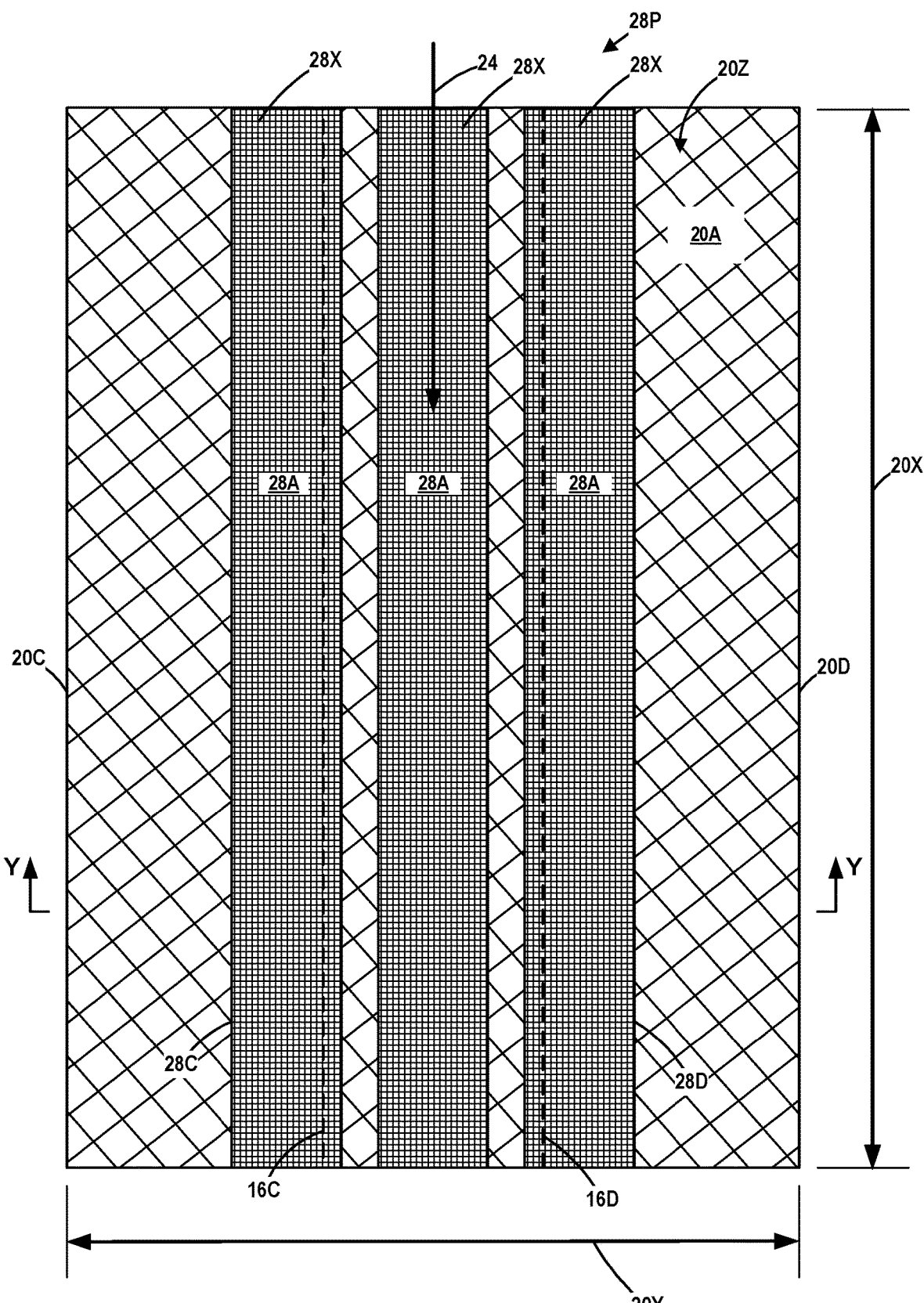

FIGS. 4 and 5 depict an embodiment of the laser 10 that is similar to that depicted in FIG. 1. However, relative to the embodiment shown in FIG. 1, in the embodiment shown in FIGS. 4 and 5, the above-described upper light-confining structure 28 has been patterned such that it has a plurality of spaced-apart features 28X, each of which have an upper surface 28A, a bottom surface 28B and side surfaces 28C, 28D. The patterned upper light-confining structure will be referenced using the numeral 28P. In this particular embodiment, the features 28X of the patterned upper light-confining structure 28P are formed on and in contact with the upper surface 20A of the gain medium layer 20. FIG. 4 is a cross-sectional view taken through the laser 10 in a direction that is transverse to the laser emitting direction 24 of the laser 10. FIG. 5 is a plan view showing portions of the upper surface 20A of the gain medium layer 20 as well as the upper surface 28A and the side surfaces 28C, 28D of each of the features 28X of the patterned upper light-confining structure 28P. In one illustrative embodiment, the patterned upper light-confining structure 28P has an overall width in the transverse direction that is less than the width of the gain medium layer 20. However, the overall length and overall width of the patterned upper light-confining structure 28P may vary depending upon the particular application. In one illustrative embodiment, the length and/or width of the patterned upper light-confining structure 28P (considering all of the features collectively) may be less than, substantially equal to, or greater than the corresponding length and/or width of the gain medium layer 20. The length and width of each of the patterned features 28X as well as the spacing between each of the patterned features 28X may also vary depending upon the particular application. The spacing between the patterned features 28X need not be uniform among all of the features 28X, but that may be the case in some applications. The patterned upper light-confining structure 28P may be formed by performing known deposition, masking and etching techniques.

Figure 6:
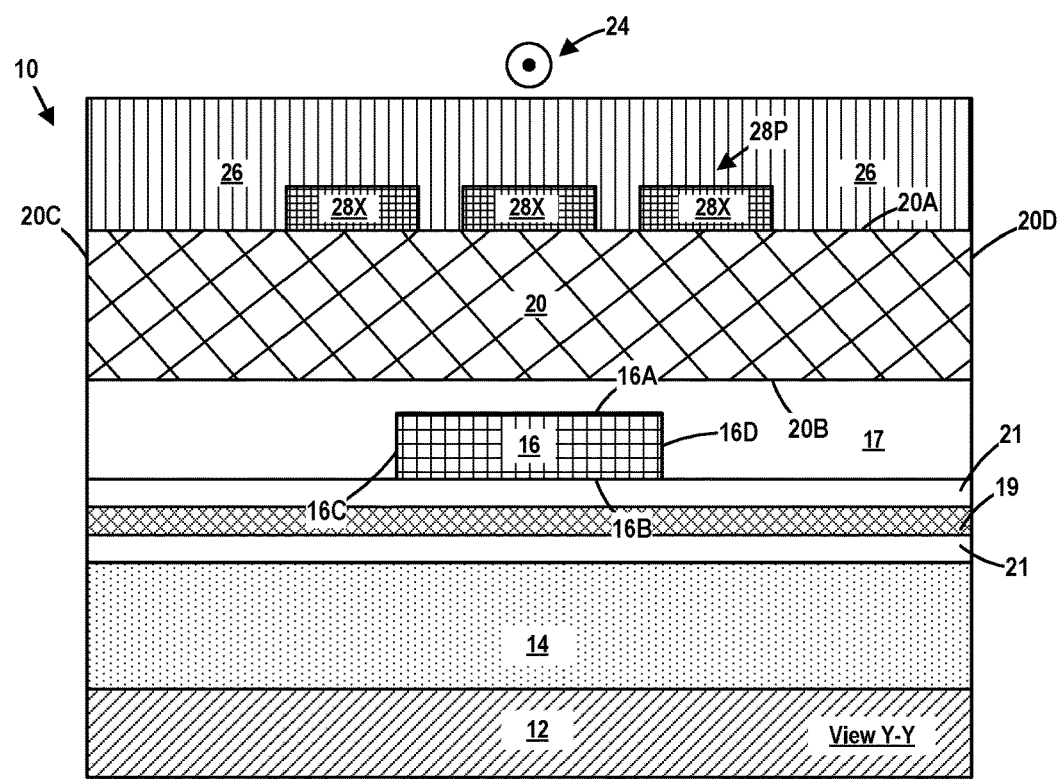

FIG. 6 depicts an embodiment of the laser 10 that is similar to that depicted in FIG. 3. However, relative to the embodiment shown in FIG. 3, in the embodiment shown in FIG. 6, the upper light-confining structure 28 shown in FIG.

3 has been replaced with the above-described patterned upper light-confining structure 28P shown in FIG. 4.

Figure 7:
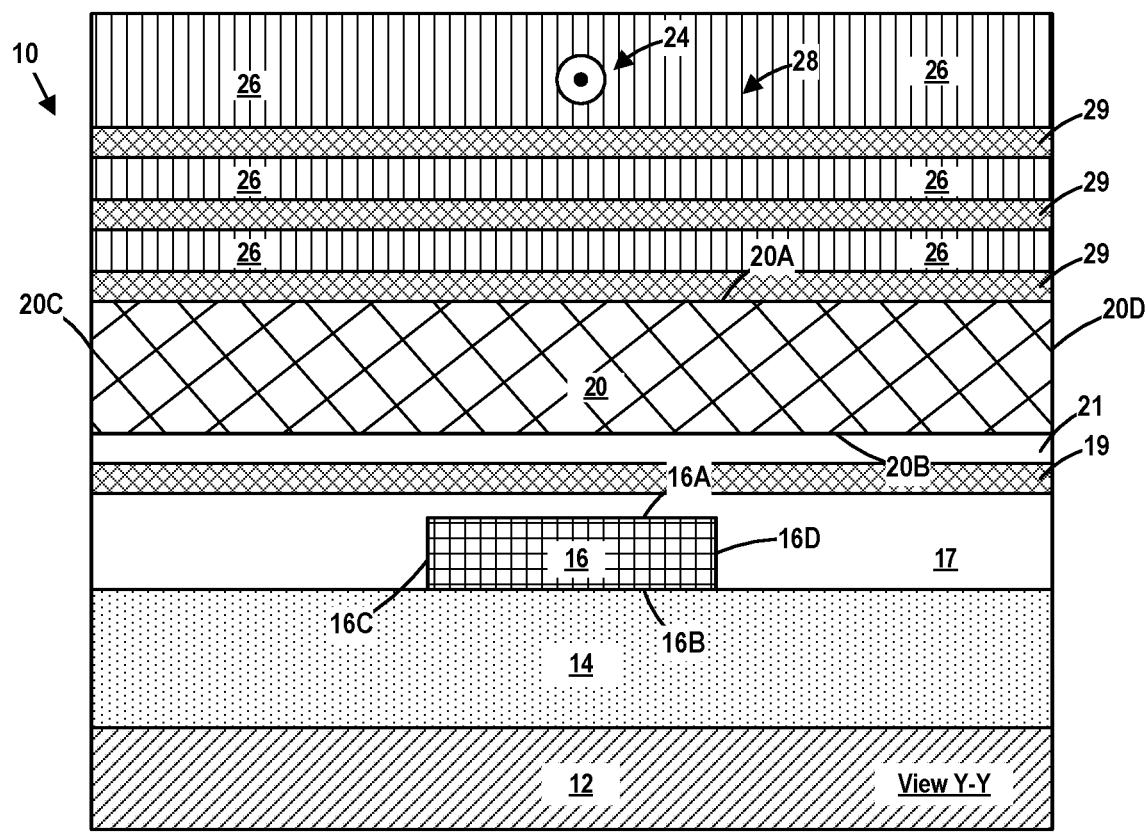

FIG. 7 depicts yet another embodiment of the laser 10 that is similar to that depicted in FIG. 1. However, relative to the embodiment shown in FIG. 1, in the embodiment shown in FIG. 7, the upper light-confining structure 28 takes the form of a plurality, e.g., three, of vertically spaced-apart second layers of high index of refraction material 29 formed above the gain medium layer 20 in between layer(s) of the BEOL materials 26. Of course, in other embodiments, the upper light-confining structure 28 may comprise only two such second layers of high index of refraction material 29 that are formed above the gain medium layer 20. In yet other embodiments, more than three second layers of high index of refraction material 29 may be formed above the gain medium layer 20. In the depicted embodiment, the bottom-most layer of the second layers of high index of refraction material 29 is formed on and in contact with the upper surface 20A of the gain medium layer 20. In the one illustrative example, all of the second layers of high index of refraction material 29 may have the same width and length as that of the gain medium layer 20. However, the physical dimensions, e.g., the thickness, length and/or width, of each of the individual second layers of high index of refraction material 29 are independent from one another and they may vary depending upon the particular application. The length and/or width of each of the individual second layers of high index of refraction material 29 may be less than, substantially equal to or greater than the corresponding length and/or width of the gain medium layer 20. The second layers of high index of refraction material 29 may have an index of refraction of at least 2.0 and they may comprise any of the materials identified above for the first layer of high index of refraction material 19. Additionally, the material selected for each of the second layers of high index of refraction material 29 of the upper light-confining structure 28 shown in FIG. 7 may be different from one another. In some applications, all of the individual second layers of high index of refraction material 29 of the upper light-confining structure 28 shown in FIG. 7 may be made of the same material and have the same physical dimensions, but that may not be the case in all applications. Additionally, various embodiments of the lasers 10 disclosed below employ multiple second layers of high index of refraction material 29. However, all of the second layers of high index of refraction material 29 within a particular embodiment of a laser 10 disclosed herein need not be made of the same material and they need not all have the same physical dimensions, although such a situation may occur in some applications.

With reference to FIGS. 4 and 7 as examples, in relative terms, in one embodiment, both the lower light-confining structure 16 and the upper light-confining structure 28 have the highest index of refraction among the first layer of high index of refraction material 19, the second layer of high index of refraction material 29, the first and second layers of a low-refractive-index insulating material 17 and 21, and the gain medium layer 20. In some cases, the index of refection of the lower light-confining structure 16 and the upper light-confining structure 28 may be different from one another, e.g., the lower light-confining structure 16 may have a higher index of refraction than that of the upper light-confining structure 28 or vice-versa. Additionally, the index of refraction of the gain medium layer 20 is typically less than the index of refraction of the first layer(s) of high index of refraction material 19 and the second layer(s) of high index insulating material 29. In contrast, in some situations, the index of refraction of the first layer(s) of high index of refraction material 19 and/or the second layer(s) of high index insulating material 29 may be less than the index of refraction of the lower light-confining structure 16 or the upper light-confining structure 28. Typically, the BEOL materials 26 as well as the layers 21 and 17 have the lowest (in a relative sense) index of refraction as compared to the other materials discussed above.

Figure 8:
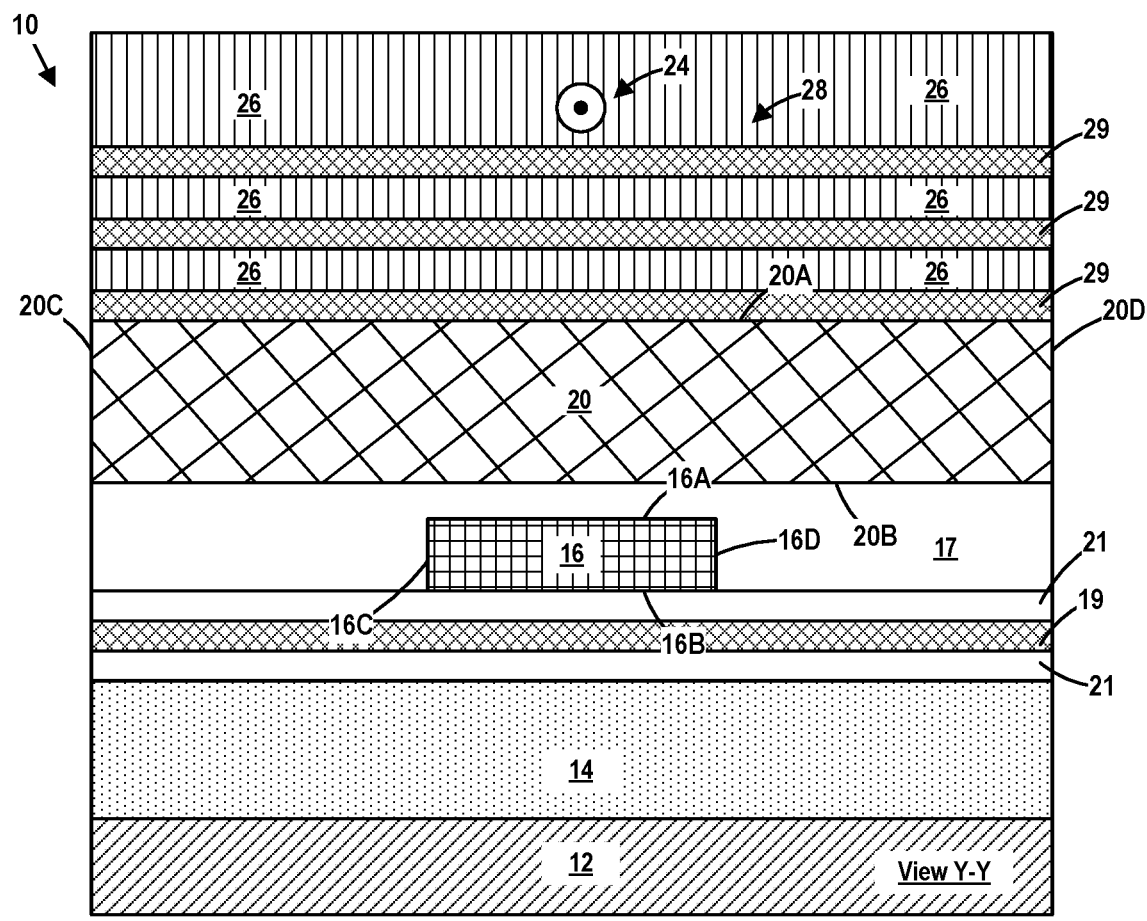

FIG. 8 depicts an embodiment of the laser 10 that is similar to that depicted in FIG. 3. However, relative to the embodiment shown in FIG. 3, in the embodiment shown in FIG. 8, the upper light-confining structure 28 shown in FIG. 3 has been replaced with the form of the upper light-confining structure 28 shown in FIG. 7.

Figure 9:
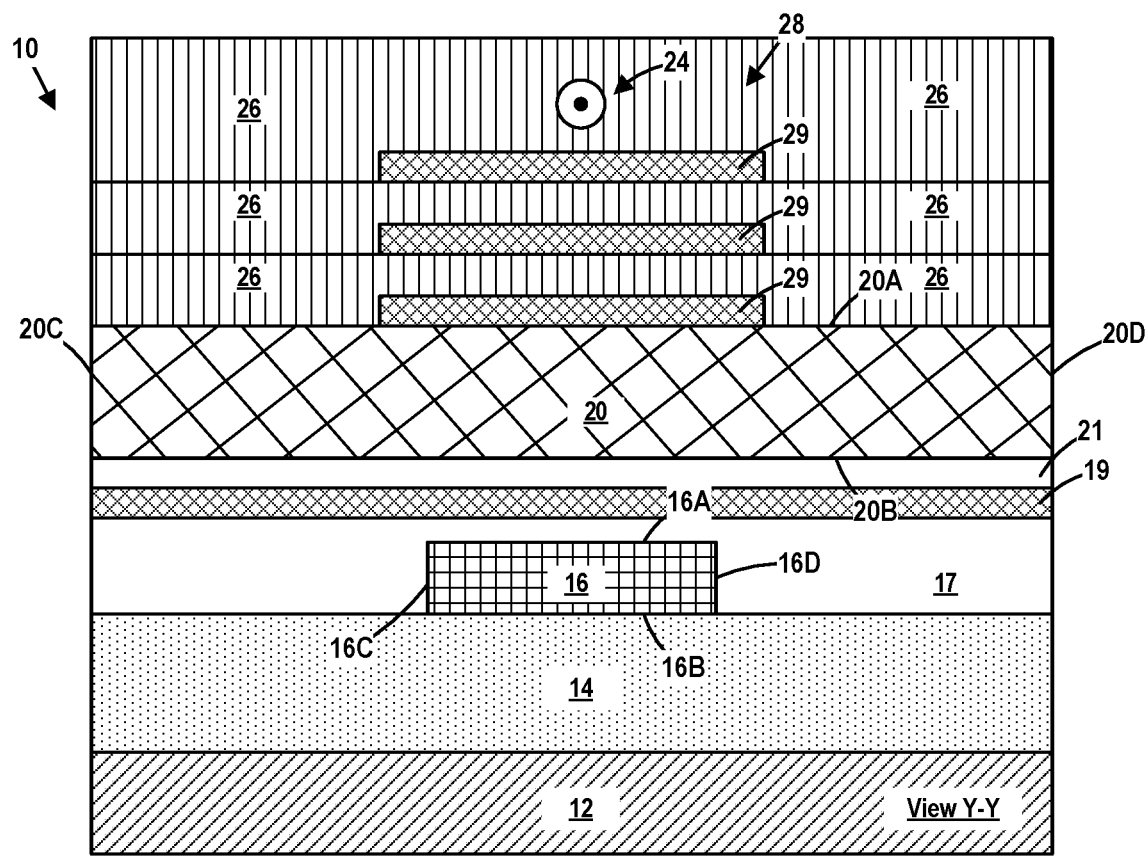

FIG. 9 depicts an embodiment of the laser 10 that is similar to that depicted in FIG. 7. However, relative to the embodiment shown in FIG. 7, in the embodiment shown in FIG. 9, the above-described three second layers of high index insulating material 29 of the upper light-confining structure 28 shown in FIG. 7 were patterned such that each of the patterned second layers of high index insulating material 29 has a single feature with a width that is less than the width of the gain medium layer 20. That is, in the embodiment depicted in FIG. 9, the upper light-confining structure 28 comprises a plurality of vertically spaced-apart patterned second layers of high index insulating material 29 that are positioned between layer(s) of the BEOL materials 26. However, as before, the thickness, length and/or width of each of the patterned second layers of high index insulating material 29 shown in the upper light-confining structure 28 shown in FIG. 9 may vary individually depending upon the particular application. Additionally, the length and/or width of each of the individual patterned second layers of high index insulating material 29 in the upper light-confining structure 28 shown in FIG. 9 may be less than, substantially equal to or greater than the corresponding length and/or width of the gain medium layer 20.

Figure 10:
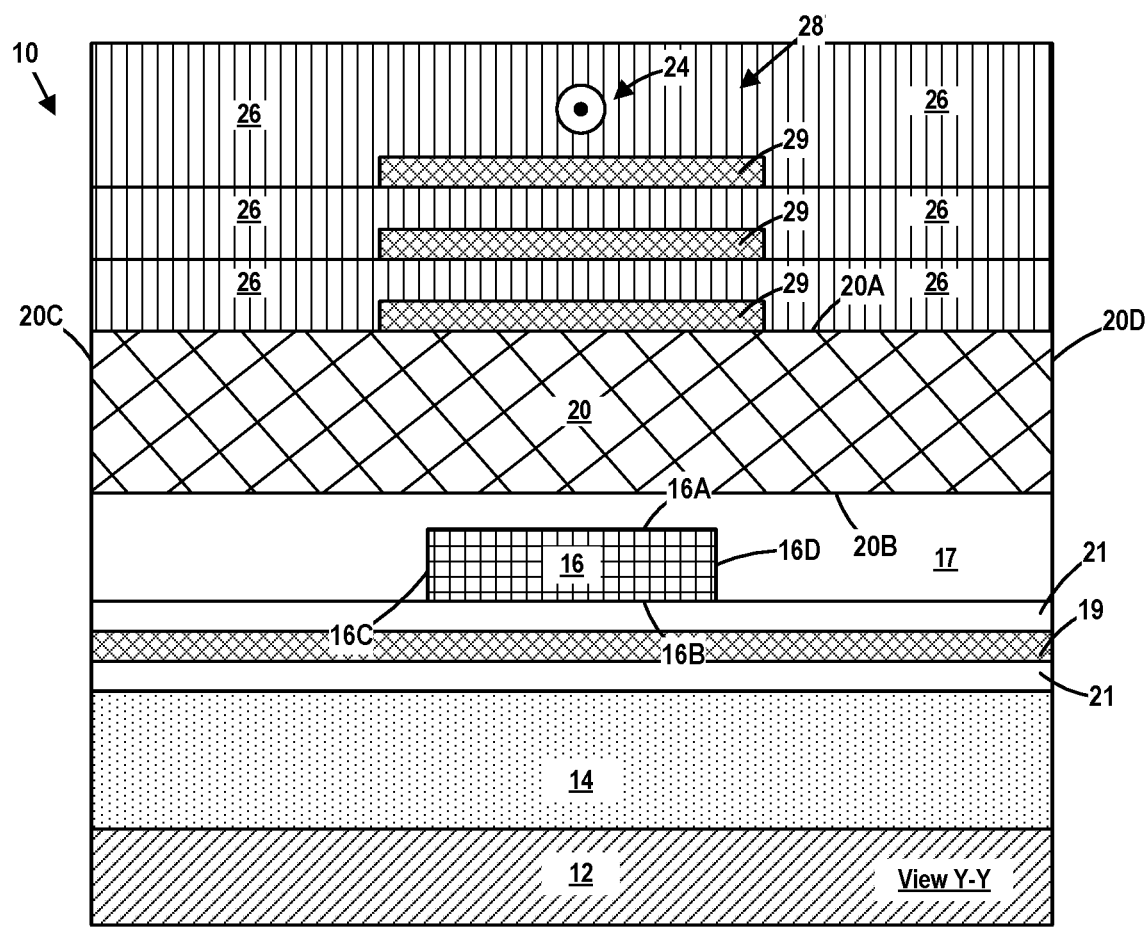

FIG. 10 depicts an embodiment of the laser 10 that is similar to that depicted in FIG. 8. However, relative to the embodiment shown in FIG. 8, in the embodiment shown in FIG. 10, the form of the upper light-confining structure 28 shown in FIG. 8 was replaced with the form of the upper light-confining structure 28 shown in FIG. 9.

Figure 11:
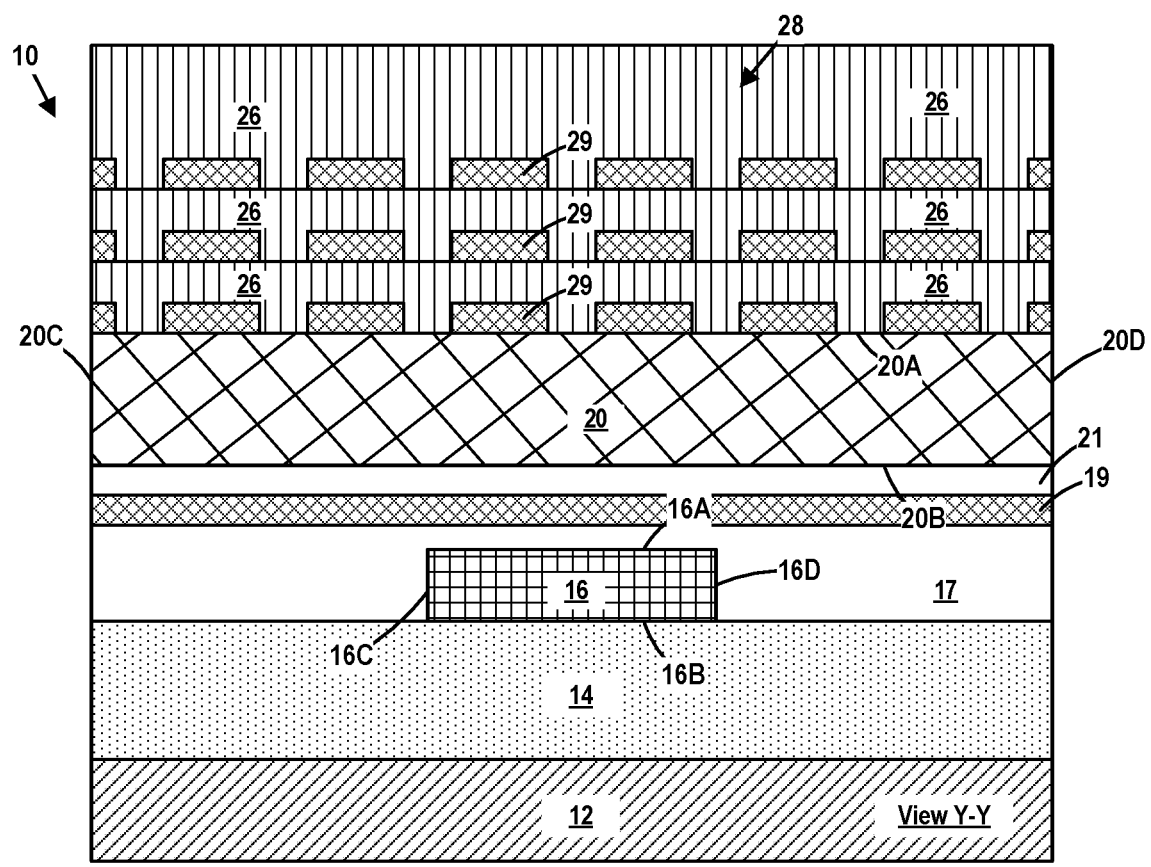

FIG. 11 depicts an embodiment of the laser 10 that is similar to that depicted in FIG. 7. However, relative to the embodiment shown in FIG. 7, in the embodiment shown in FIG. 11, the above-described three second layers of high index of refraction material 29 shown in FIG. 7 were patterned such that each of the patterned second layers of high index of refraction material 29 comprises a plurality of individual features. In the example shown in FIG. 11, each of the patterned second layers of high index of refraction material 29 (considering all of the patterned features within a layer collectively) has the same width and length as that of the gain medium layer 20. However, the thickness, length and/or width of each of the patterned second layers of high index of refraction material 29 shown in FIG. 11 may vary individually depending upon the particular application. Additionally, the length and/or width of each of the individual patterned second layers of high index of refraction material 29 shown in FIG. 11 may be less than, substantially equal to or greater than the corresponding length and/or width of the gain medium layer 20. Moreover, the thickness, length and width of the patterned features in the patterned second layers of high index of refraction material 29 of the upper light-confining structure 28 shown in FIG. 11, as well as the spacing between the patterned features, may vary depending upon the particular application. The spacing between the patterned features of the upper light-confining structure 28 shown in FIG. 11 need not be uniform among all of the features of the second layers of high index of refraction material 29, but that may be the case in some applications. The patterned second layers of high index of refraction material 29 of the upper light-confining structure 28 shown in FIG. 11 may be formed by performing known deposition, masking and etching techniques.

Figure 12:
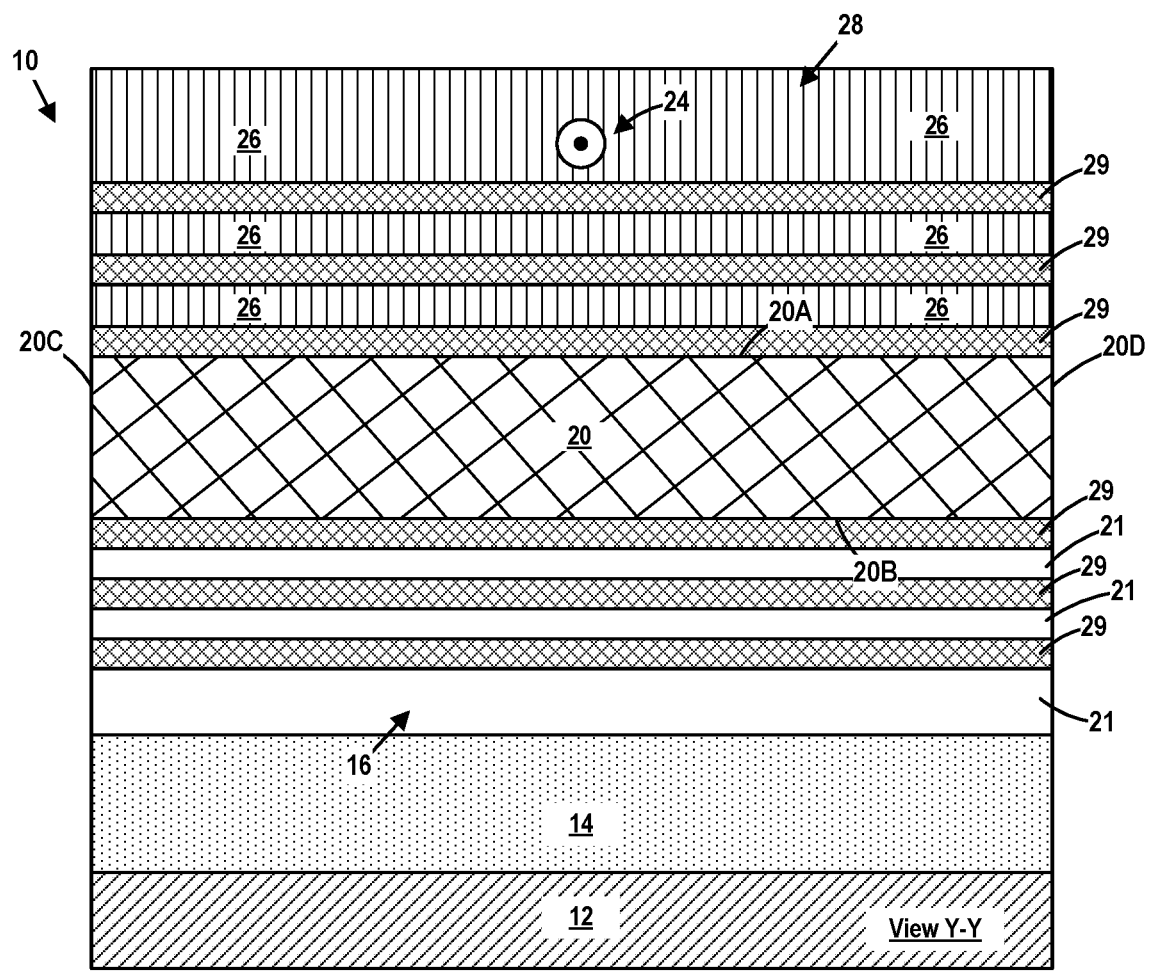

FIG. 12 depicts yet another illustrative embodiment of a laser 10 disclosed herein. In this embodiment, the upper light-confining structure 28 takes the form of a plurality of layers of the second layers of high index of refraction material 29 as described above in connection with FIG. 7. However, in this embodiment, the lower light-confining structure 16 takes the form of a plurality, e.g., three, of vertically spaced-apart layers of the above-described second layers of high index of refraction material 29 formed below the gain medium layer 20 in between the third layers of low-refractive-index insulating material 21. Of course, in other embodiments, the lower light-confining structure 16 may comprise only two of such second layers of high index of refraction material 29 that are formed below the gain medium layer 20. In yet other embodiments, more than three of the second layers of high index of refraction material 29 may be formed below the gain medium layer 20. In the depicted embodiment, the upper-most layer of the second layers of high index of refraction material 29 of the lower light-confining structure 16 is formed on and in contact with the bottom surface 20B of the gain medium layer 20. The comments above with respect to the variability of the individual physical dimensions and materials for the second layers of high index of refraction material 29 apply equally when they are used as part of the lower light-confining structure 16 shown in FIG. 12 (as well as other figures herein).

Figure 13:
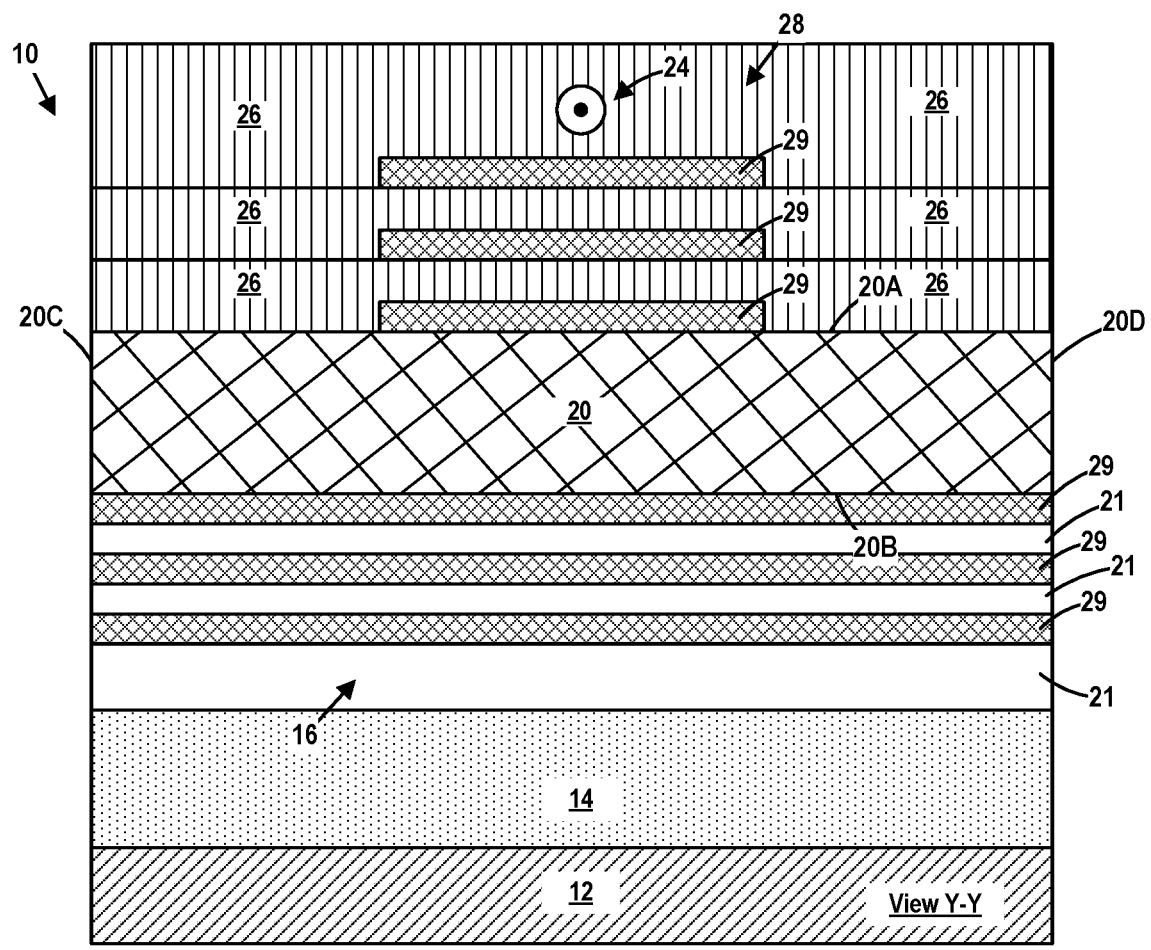

FIG. 13 depicts an embodiment of the laser 10 that is similar to that depicted in FIG. 12. However, relative to the embodiment shown in FIG. 12, in the embodiment shown in FIG. 13, the form of the upper light-confining structure 28 shown in FIG. 12 has been replaced with the form of the upper light-confining structure 28 shown in FIG. 9. That is, in the embodiment shown in FIG. 13, the upper light-confining structure 28 comprises a plurality of vertically spaced-apart patterned second layers of high index of refraction material 29 that are positioned between layer(s) of the BEOL materials 26, while the lower light-confining structure 16 comprises the plurality of the second layers of high index of refraction material 29 shown in FIG. 12.

Figure 14:
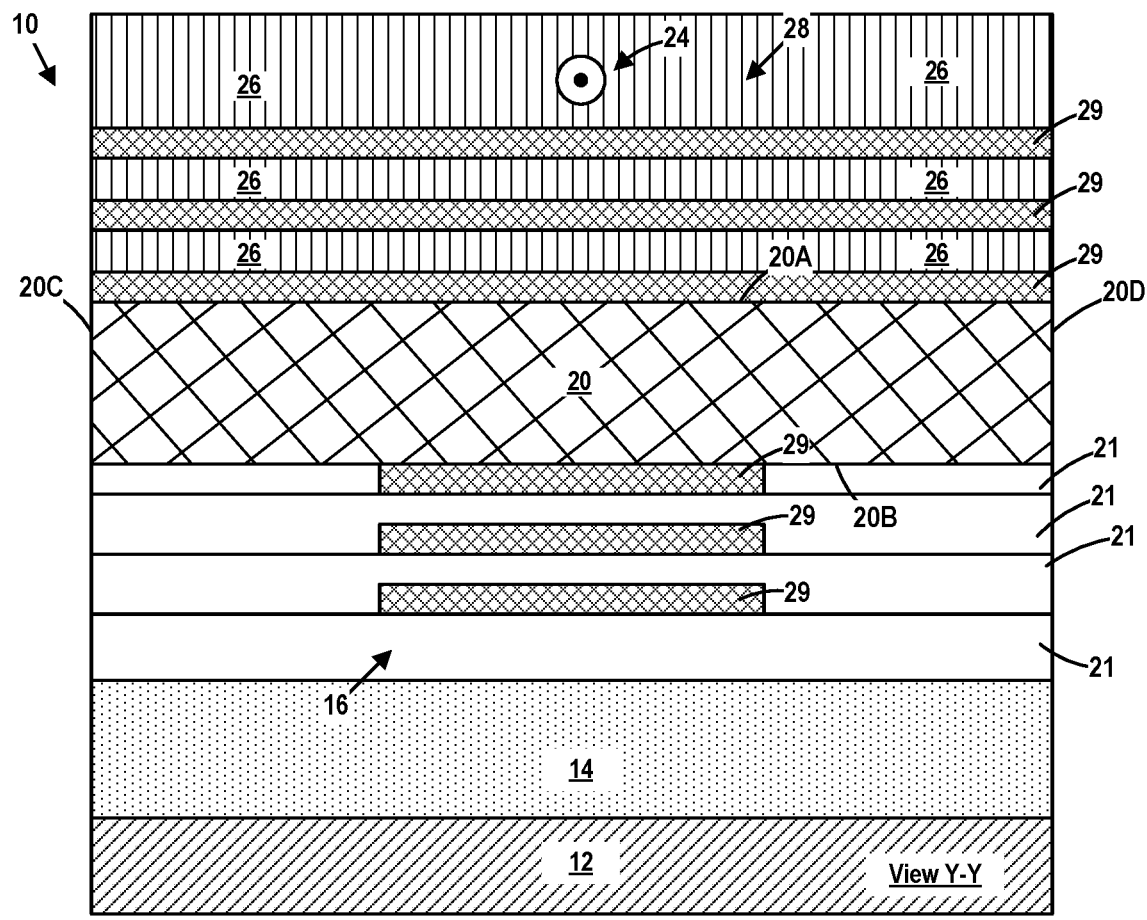

FIG. 14 depicts an embodiment of the laser 10 that is similar to that depicted in FIG. 12. However, relative to the embodiment shown in FIG. 12, in the embodiment shown in FIG. 14, the above-described three second layers of high index of refraction material 29 of the lower light-confining structure 16 (shown in FIG. 12) were patterned such that each of the patterned second layers of high index of refraction material 29 has a single feature width that is less than the width of the gain medium layer 20. That is, in the embodiment depicted in FIG. 14, the lower light-confining structure 16 comprises a plurality of vertically spaced-apart patterned second layers of high index of refraction material 29 that are positioned between layer(s) of the third low-refractive-index insulating material 21, i.e., the lower light-confining structure 16 shown in FIG. 12 has a configuration similar to that of the upper light-confining structure 28 shown in FIG. 13.

Figure 15:
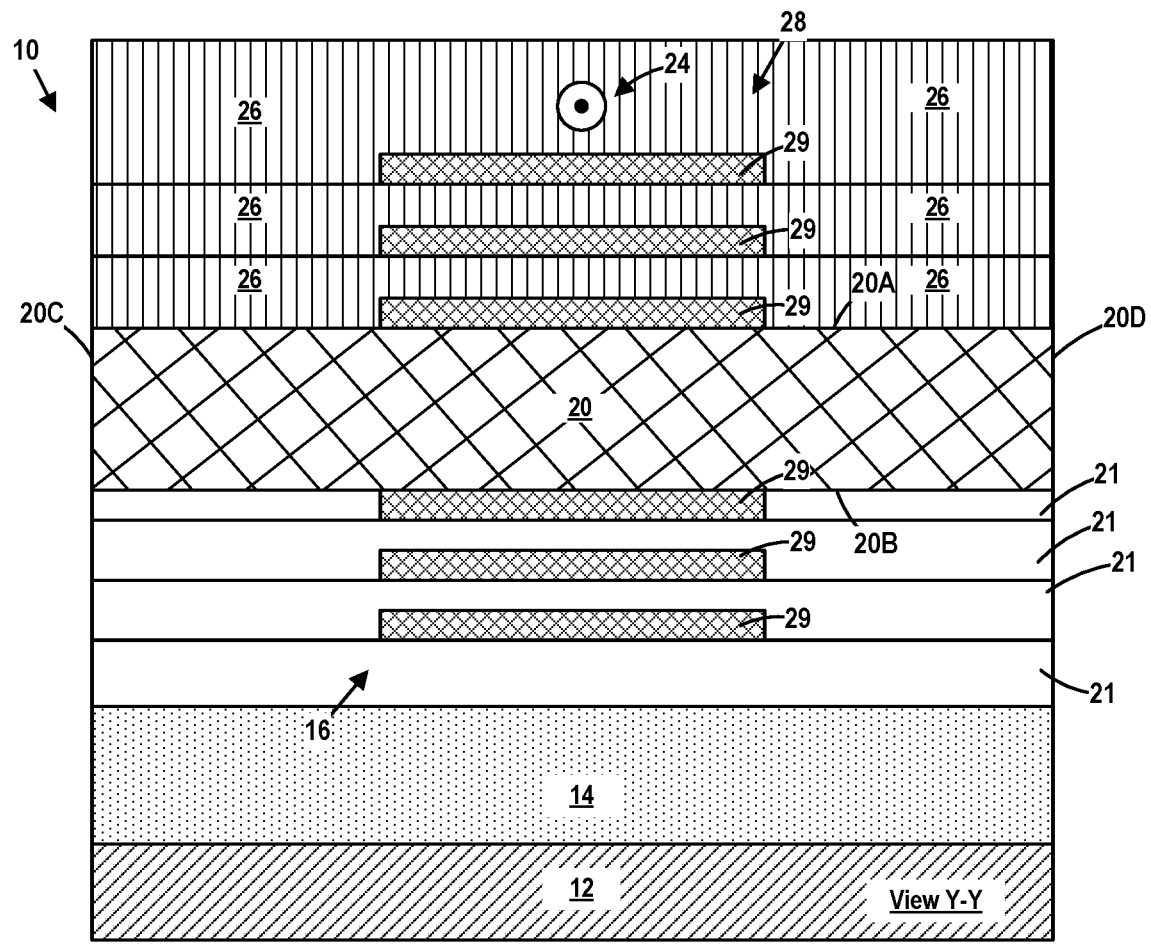

FIG. 15 depicts an embodiment of the laser 10 that is similar to that depicted in FIG. 14. However, relative to the embodiment shown in FIG. 14, in the embodiment shown in FIG. 15, the above-described three second layers of high index of refraction material 29 of the upper light-confining structure 28 shown in FIG. 14 were patterned such that each of the patterned second layers of high index of refraction material 29 positioned above the gain medium layer 20 has a single feature with a width that is less than the width of the gain medium layer 20. However, as before, the thickness, length and/or width of each of the second layers of high index of refraction material 29 of the upper light-confining structure 28 shown in FIG. 15 may vary individually depending upon the particular application. Additionally, the length and/or width of each of the individual patterned layers of the second layers of high index of refraction material 29 of the upper light-confining structure 28 shown in FIG. 15 may be less than, substantially equal to or greater than the corresponding length and/or width of the gain medium layer 20.

Figure 16:
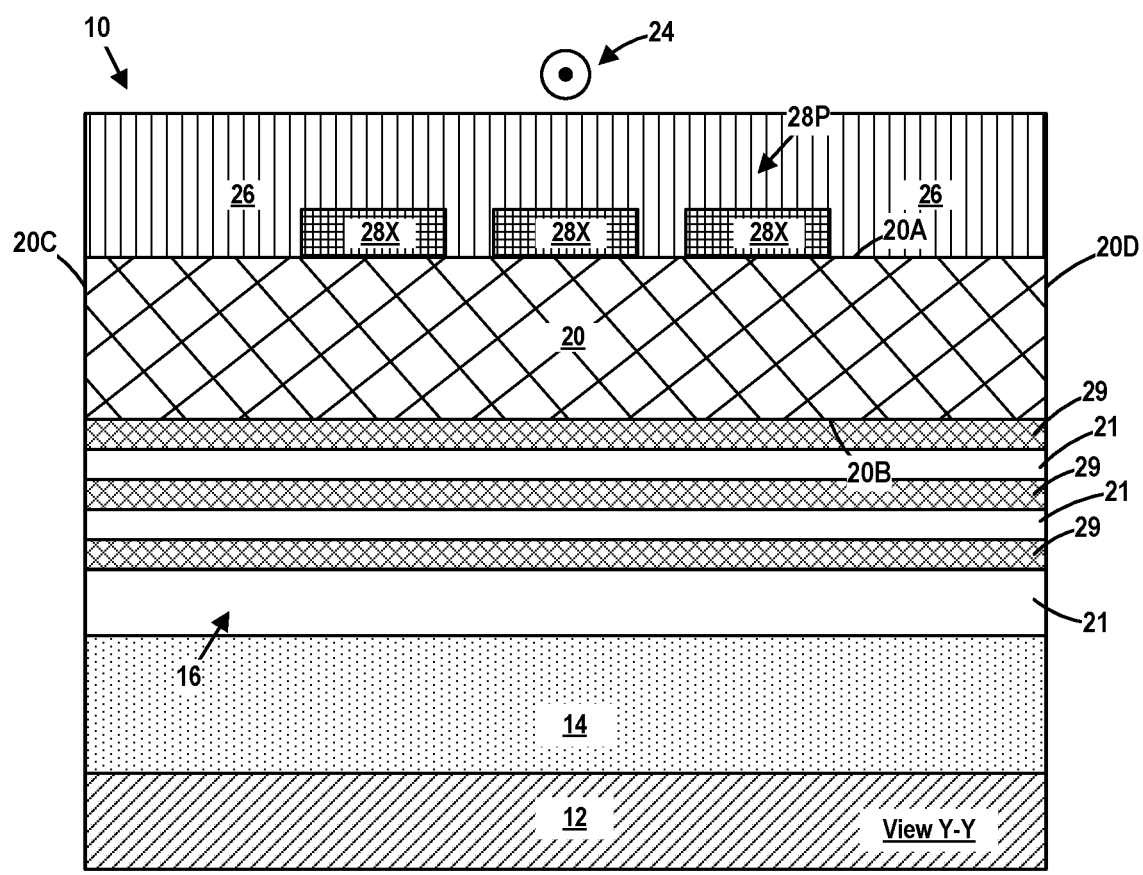

FIG. 16 depicts an embodiment of the laser 10 that is similar to that depicted in FIG. 12. However, relative to the embodiment shown in FIG. 12, in the embodiment shown in FIG. 16, the form of the upper light-confining structure 28 in FIG. 12 was replaced with the patterned upper light-confining structure 28P described above in connection with FIG. 6.

Figure 17:
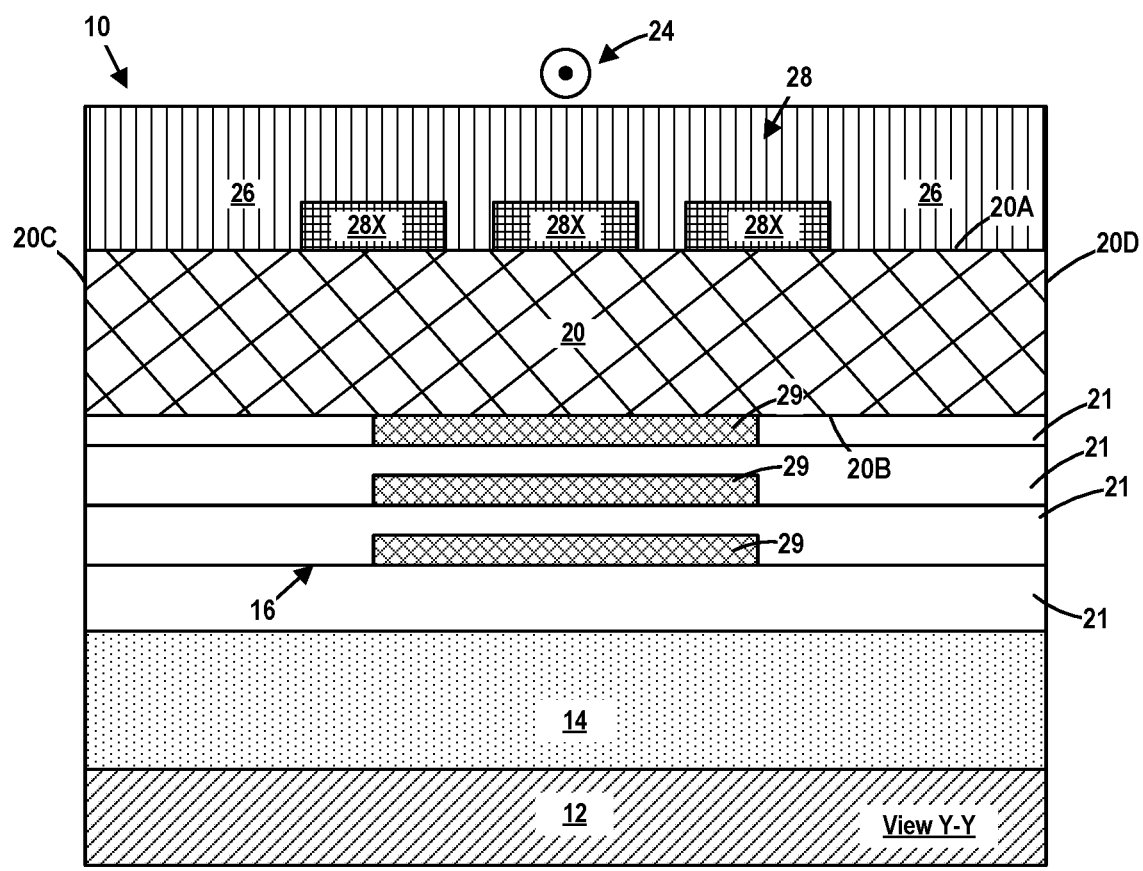

FIG. 17 depicts an embodiment of the laser 10 that is similar to that depicted in FIG. 14. However, relative to the embodiment shown in FIG. 14, in the embodiment shown in FIG. 17, the form of the upper light-confining structure 28 in FIG. 14 is replaced with the patterned upper light-confining structure 28P described above in connection with FIG. 6.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A laser having a laser emitting direction and a transverse direction that is orthogonal to the laser emitting direction, the laser comprising:
   a gain medium layer doped with a rare earth metal, the gain medium layer having an upper surface, a lower surface and a first width in the transverse direction;
   first light-confining structure having a lower surface that is positioned on and in contact with the upper surface of the gain medium layer, the first light-confining structure having a second width in the transverse direction that is at most equal to the first width, wherein the first light-confining structure comprises at least one material having an index of refraction that is at least 2.0;

a first insulating material positioned above the upper surface of the gain medium layer;

a second light-confining structure positioned below the lower surface of the gain medium layer, the second light-confining structure having a third width in the transverse direction that is at most equal to the first width, wherein the second light-confining structure comprises at least one material having an index of refraction that is at least 2.0; and a second insulating material positioned below the lower surface of the gain medium layer, wherein the indexes of refraction of the first and second light-confining structures are greater than an index of refraction of the gain medium layer, and wherein the index of refraction of the gain medium layer is greater than indexes of refraction of the first and second insulating materials.

2. The laser of claim 1, wherein the second width is substantially equal to the third width.

3. The laser of claim 1, wherein an upper surface of the second light-confining structure is positioned on and contact with the lower surface of the gain medium layer.

4. The laser of claim 1, wherein the gain medium layer has a first axial length in the laser emitting direction, the first light-confining structure has a second axial length in the laser emitting direction, and the second light-confining structure has a third axial length in the laser emitting direction, wherein the first, second and third axial lengths are the same.

5. The laser of claim 4, wherein the second and third axial lengths are less than the first axial length.

6. The laser of claim 1, wherein the gain medium layer has one of a substantially rectangular configuration or a substantially trapezoidal configuration when viewed from above.

7. The laser of claim 1, wherein the first light-confining structure and the second light-confining structure comprise at least one layer of a same material.

8. The laser of claim 1, wherein the first light-confining structure consists of a single layer of material that is continuous across the second width and the second light-confining structure consists of a single layer of material that is continuous across the third width.

9. The laser of claim 1, wherein the first light-confining structure comprises a plurality of first patterned features with a lateral space between adjacent first patterned features.

10. The laser of claim 1, wherein the first light-confining structure comprises a plurality of vertically spaced apart layers of material each having an index of refraction of at least 2.

11. The laser of claim 10, wherein each of the plurality of vertically spaced apart layers of material comprises a plurality of first patterned features with a lateral space between adjacent first patterned features.

12. The laser of claim 1, wherein the second light-confining structure comprises a plurality of vertically spaced apart layers of material each having an index of refraction of at least 2.

13. The laser of claim 1, wherein the first light-confining structure and the second light-confining structure comprise one of silicon, silicon nitride, AN or SiON and the gain medium layer comprises one of aluminum oxide ($Al_2O_3$), zinc oxide (ZnO), titanium dioxide ($TiO_2$), or bismuth-oxide ($Bi_2O_3$)) that is doped with a rare earth metal.

14. A laser having a laser emitting direction and a transverse direction that is orthogonal to the laser emitting direction, the laser comprising:

a gain medium layer doped with a rare earth metal, the gain medium layer having an upper surface, a lower surface and a first width in the transverse direction;

first light-confining structure having a lower surface that is positioned on and in contact with the upper surface of the gain medium layer, the first light-confining structure having a second width in the transverse direction that is less than the first width, wherein the first light-confining structure comprises at least one material having an index of refraction that is at least 2.0;

a first insulating material positioned above the upper surface of the gain medium layer;

a second light-confining structure positioned below the lower surface of the gain medium layer, the second light-confining structure having a third width in the transverse direction that is less than the first width, wherein the second light-confining structure comprises at least one material having an index of refraction that is at least 2.0; and a second insulating material positioned below the lower surface of the gain medium layer, wherein the first light-confining structure and the second light-confining structure each has an index of refraction greater than an index of refraction of the gain medium layer, and wherein the index of refraction of the gain medium layer is greater than each index of refraction of the first insulating material and the second insulating material.

15. The laser of claim 14, wherein the second width is substantially equal to the third width and wherein the gain medium layer has a first axial length in the laser emitting direction, the first light-confining structure has a second axial length in the laser emitting direction, and the second light-confining structure has a third axial length in the laser emitting direction, wherein the first, second and third axial lengths are the same.

16. The laser of claim 14, wherein an upper surface of the second light-confining structure is positioned on and in contact with the lower surface of the gain medium layer.

17. The laser of claim 14, wherein the first light-confining structure consists of a single layer of material that is continuous across the second width and the second light-confining structure consists of a single layer of material that is continuous across the third width.

18. The laser of claim 14, wherein the first light-confining structure comprises a plurality of first patterned features with a lateral space between adjacent first patterned features.

19. The laser of claim 14, wherein the first light-confining structure comprises a plurality of vertically spaced apart layers of material each having an index of refraction of at least 2, wherein the lowermost layer of the plurality of vertically spaced apart layers of material is positioned on and in contact with the upper surface of the gain medium layer.

20. The laser of claim 14, wherein the first light-confining structure and the second light-confining structure comprise at least one layer of a same material.

* * * * *